United States Patent

Boles et al.

[11] Patent Number: 5,212,371
[45] Date of Patent: May 18, 1993

[54] HAND HELD BAR CODE SCANNER WITH IMPROVED AIMING MEANS

[75] Inventors: John A. Boles, Fishers; Dean S. White, Holcomb; Randall K. Hems, Rochester, all of N.Y.

[73] Assignee: PSC, Inc., Webster, N.Y.

[21] Appl. No.: 663,229

[22] Filed: Mar. 1, 1991

[51] Int. Cl.$^5$ ............................................. G06K 7/10
[52] U.S. Cl. .................................. 225/472; 235/462
[58] Field of Search ................ 235/472, 467, 462, 463

[56] References Cited

U.S. PATENT DOCUMENTS

| | | | |
|---|---|---|---|
| 4,603,262 | 7/1986 | Eastman et al. | 235/472 |
| 4,758,717 | 7/1988 | Shepard et al. | 235/472 |
| 4,797,819 | 1/1989 | Dechirot | 235/385 |
| 4,820,911 | 4/1989 | Arackellian et al. | 235/467 |
| 4,825,057 | 4/1989 | Swartz et al. | 235/472 |
| 4,841,129 | 6/1989 | Tawara et al. | 235/472 |
| 4,897,532 | 1/1990 | Swartz et al. | 235/467 |

FOREIGN PATENT DOCUMENTS 62-166477  7/1987  Japan.
1276283   11/1989  Japan.

Primary Examiner—Eugene R. LaRoche
Assistant Examiner—Tan Nguyen
Attorney, Agent or Firm—M. Lukacher; J. Murphy

[57] ABSTRACT

A bar code scanner has a laser which produces a beam incident on a deflector, such as a polygon, which projects a scan beam out of the scanner so as to scan a bar code; light reflected or scattered from the code being detected so as to provide signals from which the bar code may be decoded. In order to insure that the scan beam is incident on the code, a bright oblong spot is provided by a second laser and a mirror which deflects the beam from the second laser along a path, generally paralleling the scan beam, through a cylindrical lens, and intersecting the scan beam approximately in the center of the scan on the code. The laser producing the aiming spot and the deflector drive circuits are initiated upon actuation of a trigger. The laser which produces the scan beam (the scan laser) is inhibited by circuits responsive to the movement of the deflector so that the scan laser is not turned on until the deflector is able to scan the beam from the scan laser thereby insuring that the total laser power which may illuminate a small area is within radiation, health and safety limits.

4 Claims, 2 Drawing Sheets

HAND HELD BAR CODE SCANNER WITH IMPROVED AIMING MEANS

The present invention relates to hand held or portable bar code scanners and Particularly to such scanners having improved means for aiming the scan beam so that it is incident on the code as it scans the code.

The invention is especially suitable for use in laser scanners having diode scan lasers which do not produce a visible scan beam or a scan beam, if visible, is not of sufficient brightness to be observed during normal operating conditions, for example, in a brightly lit environment, which often occurs because the scan beam spread over the entire scan path is of insufficient brightness to readily be observed in such environments. This invention is also especially suitable for use in long-range scanners where the code is distant from the scanner and is spread over a long path thereby further reducing the brightness thereof. These environments may be in brightly lit interior spaces, such as in stores having bright fluorescent lighting, and also in exterior locations where bright sunlight is present.

Aiming means for bar code scanners have heretofore been proposed and are discussed in the following U.S. Pat. No. 4,603,262 issued Jul. 29, 1986, U.S. Pat. No. 4,820,911, issued Apr. 11, 1989, U.S. Pat. No. 4,835,374 and 4,897,532 issued Jan. 30, 1990 (the latter two patents having essentially the same disclosure). The aiming systems of the foregoing patents are designed primarily for use with infrared laser diodes which produce an invisible scan beam. They propose the use of light emitting diodes (LEDs) or incandescent or gaseous light sources to produce light for aiming or marking the code. Problems remain in providing marker or aiming beams which produce light of sufficient intensity to be visible and to enable aiming of the scanner in brightly lit (either indoor or outdoor) or long-range scanning environments. A deficiency of some aiming means, such as described in the U.S. Pat. Nos. 4,835,374 and 4,897,532 patents is that the aiming beam is scanned together with the scan beam across the code thereby diminishing the brightness of the aiming beam and rendering it ineffective during scanning, especially in brightly lit environments.

It is a feature of the present invention to provide an improved bar code laser scanner which embodies aiming means having the following features: (a) a bright aiming or marker spot is produced which is on during scanning approximately at the center of scan and enables the scanner to be continuously aimed at the code until a good read is obtained; (b) the spot is elongated in the direction of the bars of the code to assist in controlling the tilt of the length of the scan to orient it generally perpendicular to the bars of the code; (c) a laser diode is utilized to provide the aiming beam; (d) the scan beam is inhibited from being produced until it can scan the code (when the deflector is fully operative to scan the beam) thereby preventing a pair of laser beams from illuminating an area with laser power of intensity in excess of radiation health and safety limits; and (e) the aiming means is implemented at low cost and may be retrofit in existing bar code laser scanners without total redesign and reconstruction thereof.

Briefly described, the invention provides in a hand held laser scanner having a first laser which produces a first laser beam, a deflector, such as a polygon for scanning the beam across the bar code to provide the scan beam, and an improved aiming system utilizing a second laser. Both the first and second lasers may be laser diodes. The second laser is preferably a laser diode which produces a visible (e.g. 670 nanometer) beam. The beam from the second laser is disposed along a path in a direction transverse to the scan beam leaving the deflector and is disposed in the vicinity of the deflector. A mirror is disposed along the path of the second beam (the aiming beam). The second mirror is tilted to direct the scan beam toward the bar code along a second path generally paralleling the scan beam which second path intersects the scan beam to provide a small bright spot in the general vicinity of the center of the scan across the bar code. The aiming beam path is through a cylindrical lens so that the spot is oblong in the direction of the bars to control the tilt of the scan beam.

The foregoing and other objects, features and advantages of the invention, as well as a presently Preferred embodiment thereof, will become more apparent from a reading of the following description in connection with the accompanying drawings in which.

Figure 3:
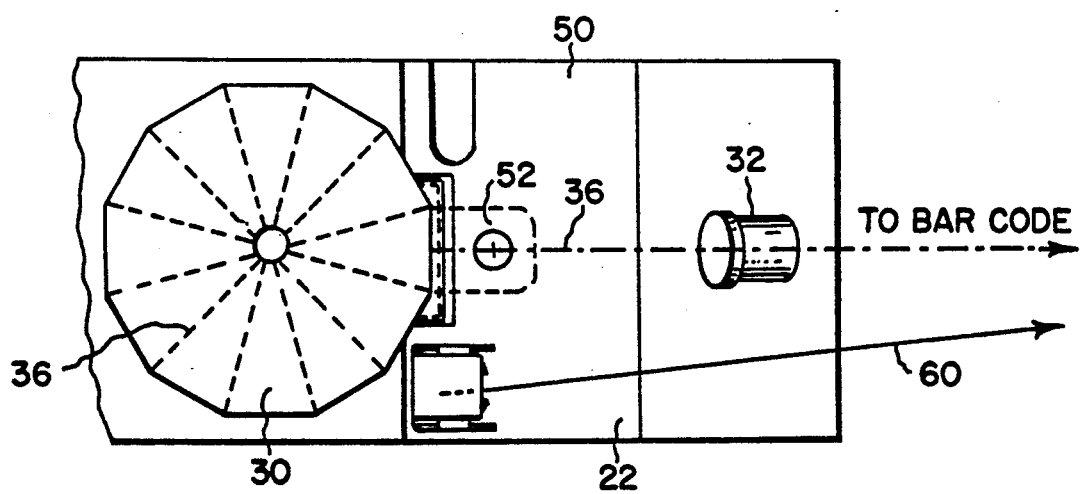
FIG. 3 is a simplified plan view illustrating the layout of the elements which produce the scan beam and the aiming or marker beam disposed on a support board of the scan engine.
Figure 2:
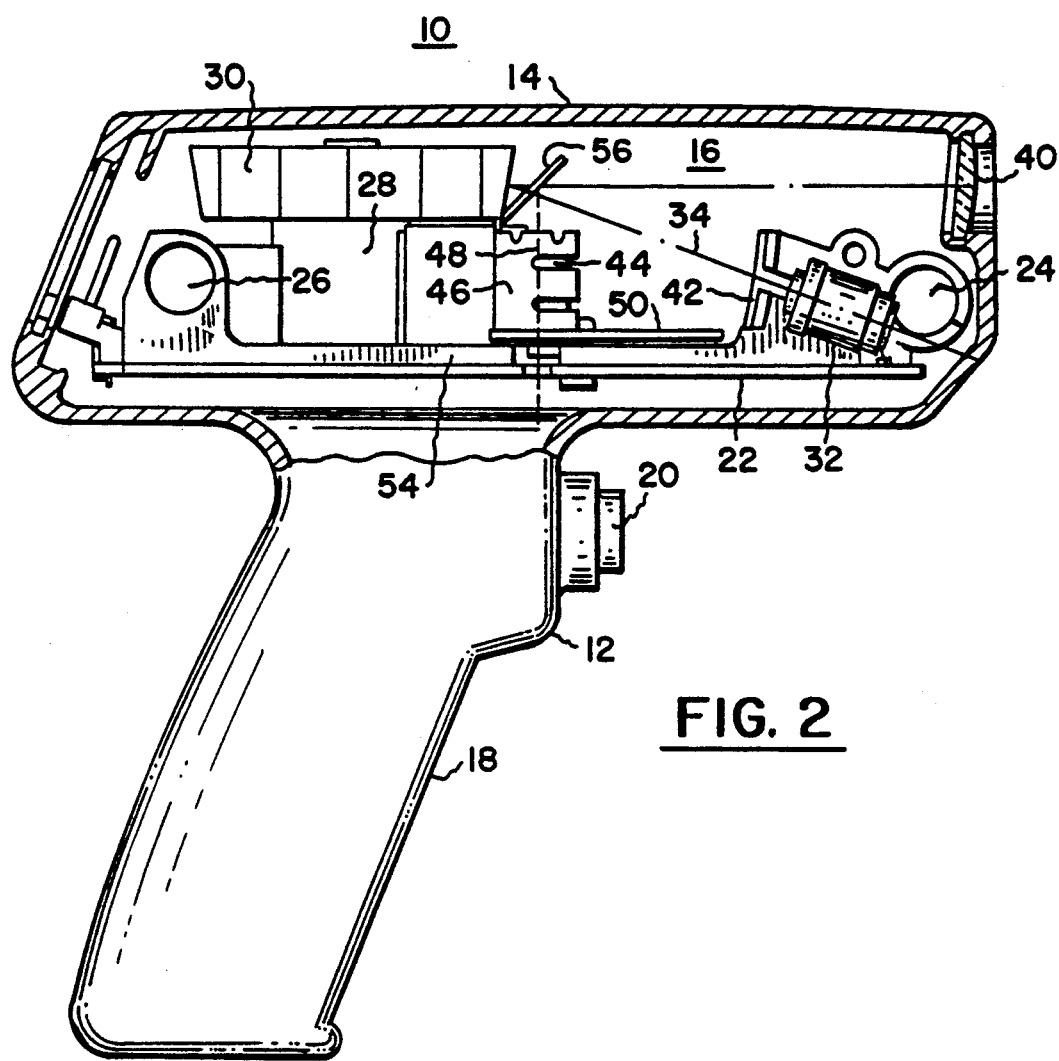
FIG. 2 is a side view of a hand held laser scanner with its housing broken away to illustrate a scan engine having improved aiming means in accordance with the invention.

Referring first to FIGS. 2 & 3, there is shown a hand held or portable bar code scanner 10 having a housing 12 with an upper body 14 in which a scan engine 16 is disposed and a handle 18 having a trigger 20. The scanner 10 is generally similar in design to the scanner shown in the above-referenced U.S. Pat. No. 4,820,911.

The scan engine includes a support board, preferably a printed circuit board 22 in a chassis 54 is mounted in the upper body 14 on mounting brackets 24 and 26 extending laterally of the chassis 54. The board 22 supports a motor 28 which rotates a multi-facet (12 facet) polygon deflector 30 about an axis generally perpendicular to the board 22. Mounted on the board 22 is a scan laser 32. The laser 32 itself is located in a metal tube and has optics (a lens) which form the light produced by the laser into a first beam along a path 34 which is incident on the facets of the deflector 30. These facets are attached to the hub of the polygon 36 (see FIG. 3). The beam 34 is incident on the facets and produces a scan beam 36. The scan beam is shown at the center of scan in FIG. 3. This scan beam exits through a cylindrical lens 40 which is part of the scan beam forming optics. Reference may be had to U.S. Pat. No. 4,820,911 for further information with respect to the scan beam optics.

The scan beam must be incident on the code, preferably with the center of scan at the mid-point of the code in order to scan the code and obtain a good read. The scanner is desirably tilted so that the length of the scan is perpendicular to the bars of the code. The light from the code is reflected back through the lens 40 and is collected by a collection mirror 42, from which it is focused on a photo diode (not shown) which produces an electrical signal. This electrical signal is processed by circuits on the board 22 to produce a signal from which the symbol represented by the code can be decoded. The light collecting optics and signal processing circuits are described in the above-referenced U.S. Pat. No. 4,820,911.

Figure 1:
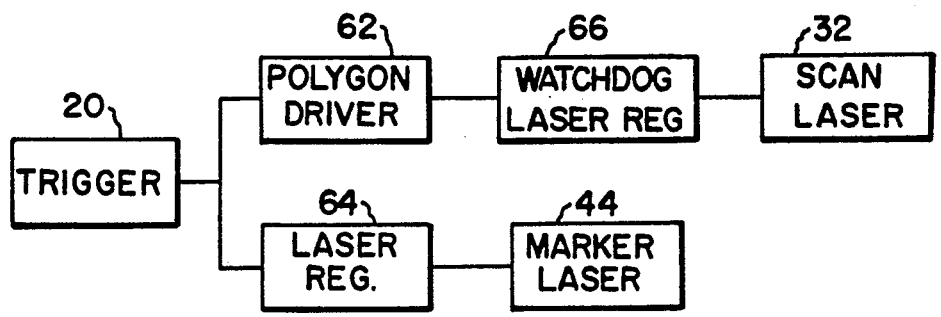
FIG. 1 is a block diagram of the system of circuits which operate a laser scanner to produce a scan beam and a marker or aiming beam in accordance with the invention.

In order to provide an aiming beam, the invention utilizes a second laser diode called a marker laser 44 (see FIG. 1). This marker laser is contained in a generally rectangular tube 46. The laser is oriented so that the aiming beam which it produces (lens or other optics) in the tube 46 may be used to form the beam along a path generally perpendicular to the board 22. This path is, of course, transverse to the scan beam 36 and is shown by the line 48 made up of long and short dashes in FIG. 2.

The lower end of the tube 46 is mounted on the board 22. Specifically, it is mounted on top of a small Printed circuit board 50 which is connected to the board 22 by a clamp 52. The clamp extends through the plastic chassis body 54 which spaces the regulator board 50 from the support board 22. The chassis 54 also holds the collection mirror 42 and the scan laser 32 in place as well as providing an anchor for the mounting brackets 24 and 26.

The top end of the tube 46 is a flap 56 extending upwardly and at a angle of approximately 45° with respect to the plane of the board 22. It is also tilted inwardly towards the center of scan 36. The inside of this tab or flap 56 is polished to provide a mirror or reflecting surface. Accordingly, the marker beam from the laser 44 is incident on the mirror 56 and is reflected along a path parallel to the path of the scan beam. This path is spaced above the support board 22 approximately the same distance as the scan beam, since the polygon 30 and the mirror 56 are both approximately the same distance from the support board 22.

As shown in FIG. 3, the marker beam, indicated at 60 in FIG. 3, intersects the bar code approximately at the center of scan and provides a bright spot thereat. A cylindrical lens 40, in the window of the housing body 40 through which the scan beam projects, fans the spot in the vertical direction. By aligning the oblong spot with the bars (by tilting the scanner) the length of the scan is aimed to be generally perpendicular to the bars of the code. In other words, cylindrical lens 40 adds power in a direction along the bars of the code thereby elongating the spot in the direction of the bars. This elongation of the spot provides a second dimension of the spot to facilitate aiming and orientation of the housing of the bar code scanner to avoid the beam from missing the code by being tilted with respect to the bars. The spot is maintained during scanning and enables the operator to continuously aim the scanner at the code until a good read is indicated.

Referring to FIG. 1, there is shown the system of circuits which insure that the intensity of both the marker and scan beam do not exceed limits set by government authority to insure health and safety, particularly that an intense laser beam which might do retinal damage be produced. Thus, even if the beam strikes an eye, the energy produced is below the limits set by governmental authority to avoid physiological damage. The trigger 20 operates conventional power circuits which apply power to the motor which drives the polygon 30. These circuits are shown in FIG. 1 as the polygon driver 62. Power is also applied to the laser regulator 64, which is a circuit of conventional design which operates the marker laser 44. In accordance with a feature of the invention, the laser regulator 64 may include a modulator which produces the operating power in pulses. Such pulse operation, while reducing intensity somewhat, has the beneficial effect of reducing the power consumption from the battery of the laser scanner.

Upon actuation of the trigger the polygon driver is enabled, as is the marker laser 64. However, the scan laser is inhibited until a watchdog circuit 66 enables its own laser regulator to power the scan laser 32. This watchdog circuit is an opto-electronic circuit such as shown in the above-referenced U.S. Pat. No. 4,820,911 which is responsive to the movement of the deflector by observing the movement of a sector target on the hub 36 of the polygon 30. Only when the rate of pulses produced by the opto-electronic circuit is sufficiently high will an enabling signal be produced which allows the watchdog laser regulator 66 to power up the scan laser 32.

From the foregoing description, it will be apparent that there has been provided an improved hand held laser scanner having an improved low cost and effective aiming system. Variations and modifications in the herein described scanner and aiming system, within the scope of the invention, will undoubtedly suggest themselves to those skilled in the art. Accordingly, the foregoing description should be taken as illustrative and not in a limiting sense.

We claim:

1. In a hand held bar code scanner which produces a scanning beam and directs said beam along a first path and has an aiming system which comprises a laser which projects an aiming laser beams along a second path independent from said scanning beam and having a window through which said scanning and aiming beam both pass and are directed to a bar code across which said scanning beam executes a scan to read said code, the improvement comprising means including a mirror disposed along said second path of said aiming laser beam for bending said aiming beam to be parallel to the scanning beam and to intersect said code at the center of the scan, and a lense in the second path to said window along the path of said aiming beam for modifying said aiming beam to provide an oblong spot in the general vicinity of the center of the scan across the bar code.

2. The hand held scanner according to claim 1 wherein the said laser for the aiming beam is provided by a laser diode having optics which form its respective beam.

3. The improvement according to claim 1 further comprising a housing having opposite ends and in which said aiming laser is mounted near one of said opposite ends facing the other of said opposite ends, said housing having a flap extending from the other of said opposite ends, and a reflective surface on said other of said opposite ends providing said mirror.

4. The hand held scanner according to claim 1 wherein said lense is a cylindrical lense in said second path for elongating said spot in the direction of the bars of said code.

* * * * *